(12) United States Patent
Snyder et al.

(10) Patent No.: US 10,683,768 B2
(45) Date of Patent: Jun. 16, 2020

(54) CIRCUMFERENTIAL AXIAL SEGMENTED TROUGH SEAL

(71) Applicant: United Technologies Corporation, Farmington, CT (US)

(72) Inventors: Brooks E. Snyder, Dartmouth (CA); Thomas N. Slavens, Moodus, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 443 days.

(21) Appl. No.: 15/113,298

(22) PCT Filed: Nov. 14, 2014

(86) PCT No.: PCT/US2014/065683
§ 371 (c)(1),
(2) Date: Jul. 21, 2016

(87) PCT Pub. No.: WO2015/112239
PCT Pub. Date: Jul. 30, 2015

(65) Prior Publication Data
US 2017/0009594 A1 Jan. 12, 2017

Related U.S. Application Data

(60) Provisional application No. 61/931,031, filed on Jan. 24, 2014.

(51) Int. Cl.
*F16J 15/08* (2006.01)
*F01D 11/00* (2006.01)

(52) U.S. Cl.
CPC .......... *F01D 11/005* (2013.01); *F01D 11/003* (2013.01); *F16J 15/0887* (2013.01); *F05D 2220/32* (2013.01); *F05D 2240/40* (2013.01); *F05D 2250/75* (2013.01); *F05D 2300/177* (2013.01)

(58) Field of Classification Search
CPC .......... F16J 15/06; F16J 15/022; F16J 15/104
USPC .............. 277/644, 650, 652, 653, 654, 647
See application file for complete search history.

(56) References Cited

U.S. PATENT DOCUMENTS 3,113,526 A * 12/1963 Paschke ................. F01C 19/10
                                                    277/357
4,602,795 A   7/1986 Lillibridge
4,759,555 A   7/1988 Halling
5,249,814 A   1/1993 Halling
5,716,052 A   2/1998 Swenson et al.
(Continued)

FOREIGN PATENT DOCUMENTS

EP    1323893 A2    7/2003
EP    1832716 A2    9/2007

OTHER PUBLICATIONS

International Search Report for International Application No. PCT/US2014/065683; dated Feb. 26, 2015.
(Continued)

*Primary Examiner* — Kristina R Fulton
*Assistant Examiner* — L. Susmitha Koneru
(74) *Attorney, Agent, or Firm* — Cantor Colburn LLP

(57) ABSTRACT

A seal for sealing a space defined by first and second components, the seal including at least one first seal and at least one second seal wherein at least a portion of the at least one first seal is disposed in the at least one second seal.

9 Claims, 4 Drawing Sheets

(56) References Cited

U.S. PATENT DOCUMENTS

| | | | |
|---|---|---|---|
| 6,199,871 B1* | 3/2001 | Lampes | F01D 11/005 |
| | | | 277/614 |
| 7,497,443 B1* | 3/2009 | Steinetz | F16J 15/0887 |
| | | | 277/644 |
| 8,210,799 B1 | 7/2012 | Rawlings | |
| 9,869,194 B2* | 1/2018 | Dev | F01D 11/005 |
| 9,957,827 B2* | 5/2018 | Davis | F16J 15/0887 |
| 9,982,550 B2* | 5/2018 | Davis | F01D 11/006 |
| 2012/0195743 A1* | 8/2012 | Walunj | F01D 11/006 |
| | | | 415/174.5 |

OTHER PUBLICATIONS

Written Opinion for International Application No. PCT/US2014/065683; dated Feb. 26, 2015.
European Search Report for Application No. EP 14 88 0056.

* cited by examiner

CIRCUMFERENTIAL AXIAL SEGMENTED TROUGH SEAL

CROSS REFERENCE TO RELATED APPLICATION

This present application is a National Phase Application of Patent Application PCT/US2014/065683 filed on Nov. 14, 2014, which is related to, and claims the priority benefit of U.S. Provisional Patent Application Ser. No. 61/931,031, filed Jan. 24, 2014. The contents of both of these applications are hereby incorporated by reference in their entirety into this application.

TECHNICAL FIELD OF THE DISCLOSED EMBODIMENTS

The presently disclosed embodiments generally relate to seals, and more particularly to a circumferentially axial segmented trough seal.

BACKGROUND OF THE DISCLOSED EMBODIMENTS

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal, m-seal, or a non-metallic rope seal are typical seals used to seal or limit secondary flow between segmented or full-hoop turbine components.

However, placement of these seals are typically far above the gas path. This placement may create a large interface cavity, which necessitates a large amount of cooling air to keep positively purged. Exposure to significant relative deflections between adjacent components and/or elevated temperatures can preclude the use of these types of seals or cause them to fail prematurely. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but has even less flexibility.

Accordingly, improvements in seal design are needed in the art.

BRIEF SUMMARY OF THE DISCLOSED EMBODIMENTS

In one aspect, a seal for sealing a space defined by first and second components is disclosed, the seal including: a longitudinal seal plane, a first seal including a first seal base, and opposing first seal ends extending from the first seal base toward the longitudinal seal plane, a second seal including: a second seal base, and opposing second seal ends extending from the second seal base toward the longitudinal seal plane; wherein the first seal is disposed in the second seal, and wherein the first seal and the second seal are configured to sealingly engage with the first and second components. In one embodiment, the first seal and the second are circumferentially disposed between the first and second components. In one embodiment, the first seal includes at least one seal gap. In one embodiment, the second seal includes at least one second seal gap.

In another aspect, a system is disclosed, including: a first component including a first surface, a second component including a second surface, the second component disposed adjacent the first component and defining a seal cavity therebetween, wherein the seal cavity comprises a substantially arcuate shape, and a seal disposed in the seal cavity, the seal including: a first seal disposed in a second seal.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

Figure 1:
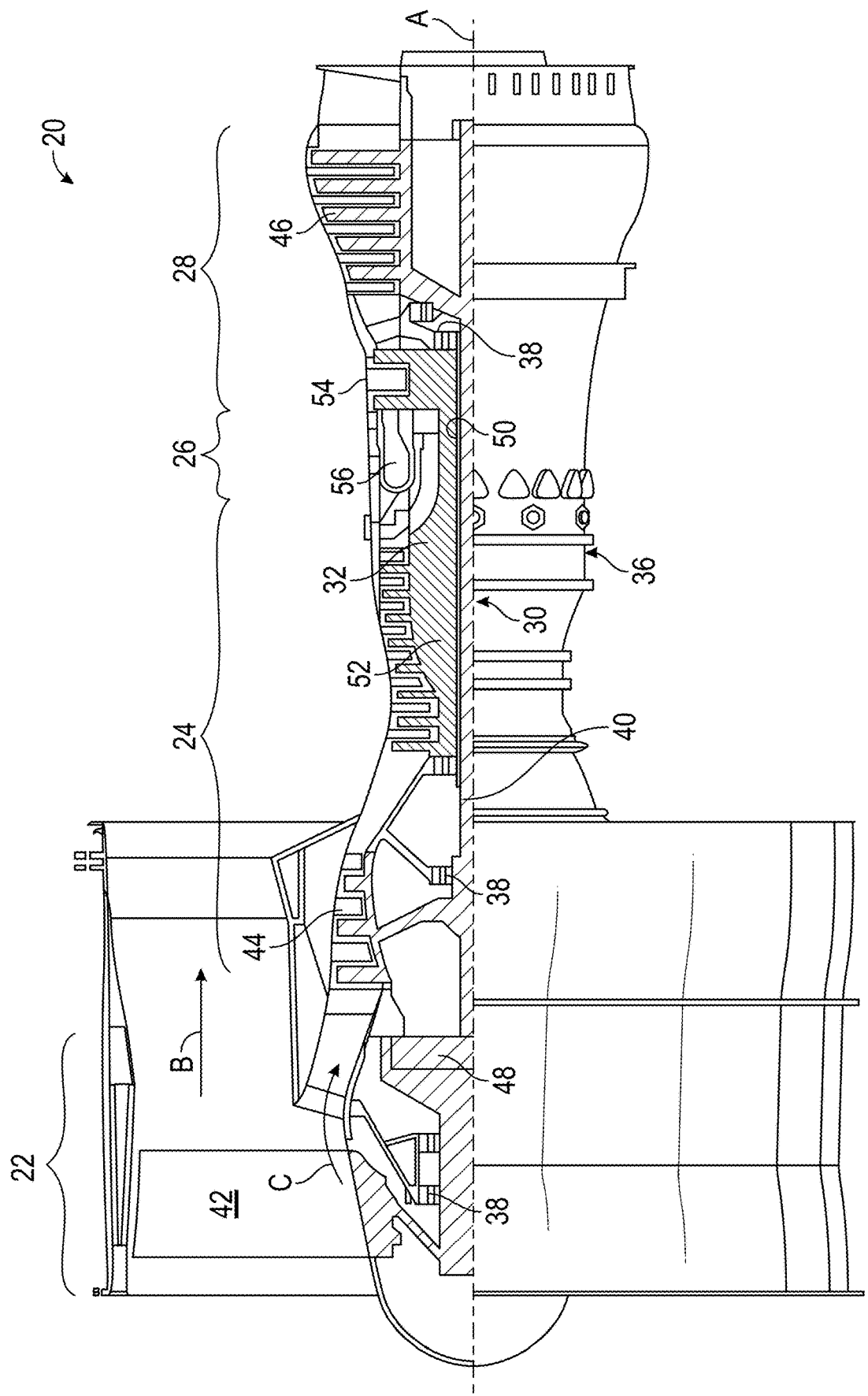
FIG. 1 is a general schematic view of a gas turbine engine.

An overview of the features, functions and/or configuration of the components depicted in the figures will now be presented. It should be appreciated that not all of the features of the components of the figures are necessarily described. Some of these non-discussed features, as well as discussed features are inherent from the figures. Other non-discussed features may be inherent in component geometry and/or configuration.

DETAILED DESCRIPTION OF THE DRAWINGS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 schematically illustrates a typical architecture for a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft. (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system.

The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft./second (about 351 m/second).

Figure 2:
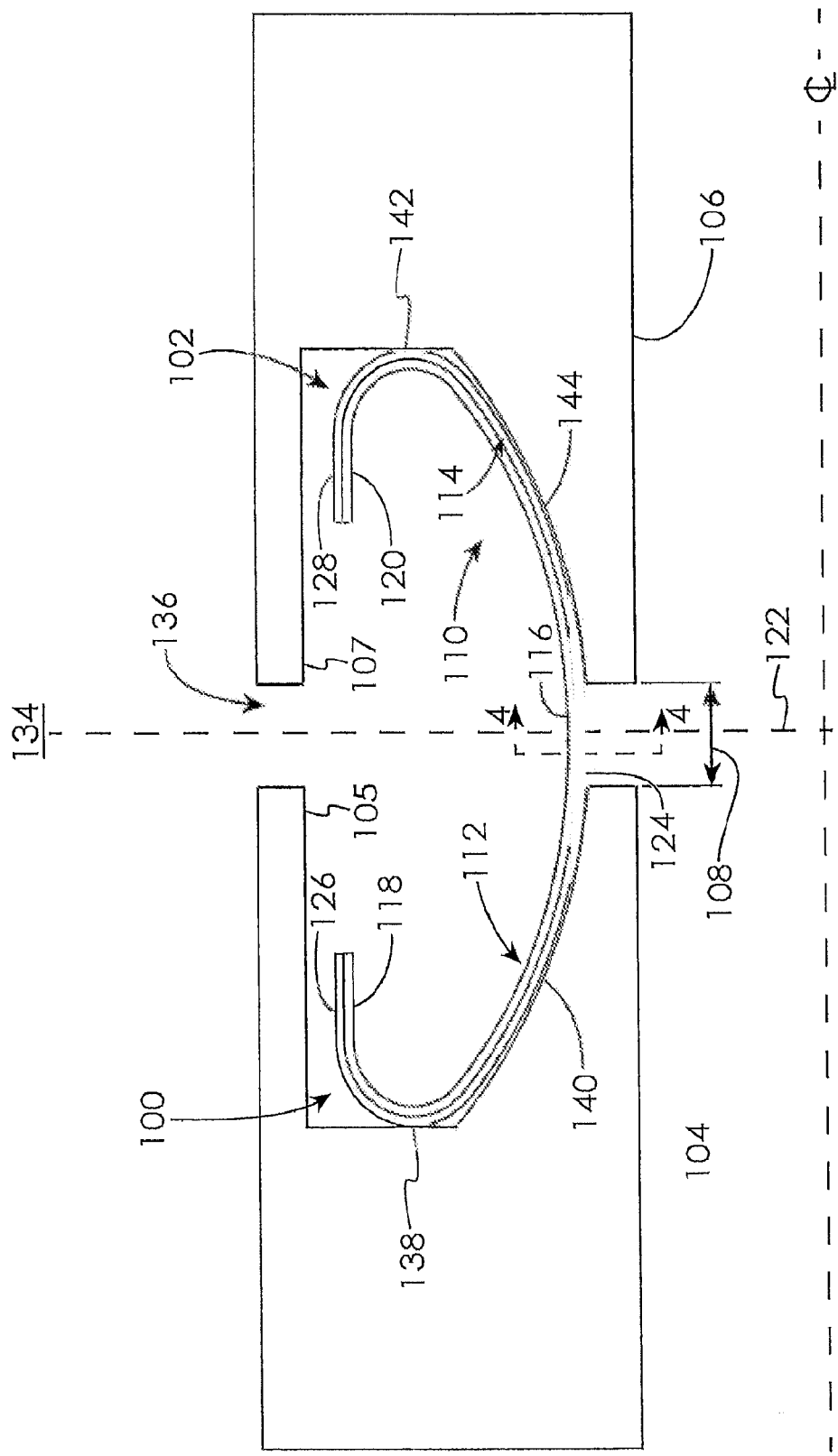
FIG. 2 is a schematic cross-sectional diagram of a seal and a seal cavity according to an embodiment of the present disclosure.

FIG. 2 schematically illustrates a cross-sectional view of seal cavities 100 and 102 formed by two axially-adjacent segmented or full-hoop turbine components 104 and 106, respectively, which may move axially, radially, and circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. For example, the seals disclosed herein may be used to seal the circumferential space between a piston and a cylinder wall in which the piston reciprocates. A nominal design clearance 108 exists between the components 104 and 106. Within the seal cavities 100 and 102 lies a seal 110.

Figure 3:
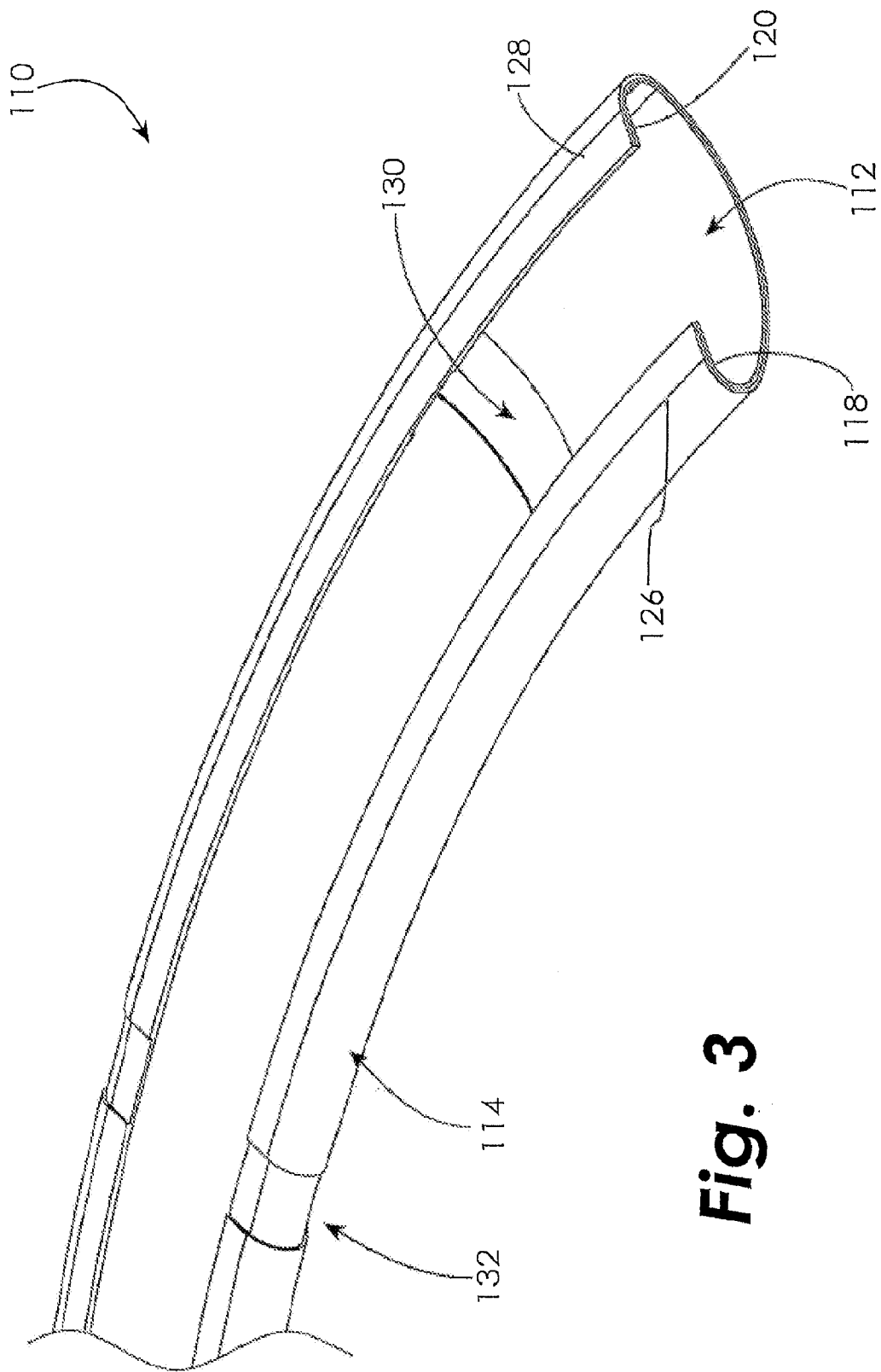
FIG. 3 is a schematic perspective diagram of a seal according to an embodiment of the present disclosure.

As shown in FIGS. 2 and 3, the seal 110 is formed from a first seal 112 disposed inside a second seal 114. The first seal 112 includes a first seal base 116, and opposing first seal ends 118 and 120. The first seal base 116 may form a substantially arcuate cross-sectional shape substantially centered about a plane 122 that contains a longitudinal axis of the seal 110. The first seal ends 118 and 120 extend from the first seal base 116 toward the plane 122. In one embodiment, the first seal ends 118 and 120 extend substantially perpendicularly toward the plane 122. In one embodiment, the first seal 112 may include slots (not shown) disposed thereon to reduce rigidity.

The second seal 114 includes a second seal base 124, and opposing second seal ends 126 and 128. The second seal base 124 may form a substantially arcuate cross-sectional shape substantially centered about a plane 122 that contains a longitudinal axis of the seal 110. The second seal ends 126 and 128 extend from the second seal base 124 toward the plane 122. In one embodiment, the second seal ends 126 and 128 extend substantially perpendicularly toward the plane 122. In one embodiment, the second seal 114 may include slots (not shown) disposed thereon to reduce rigidity.

Figure 4:
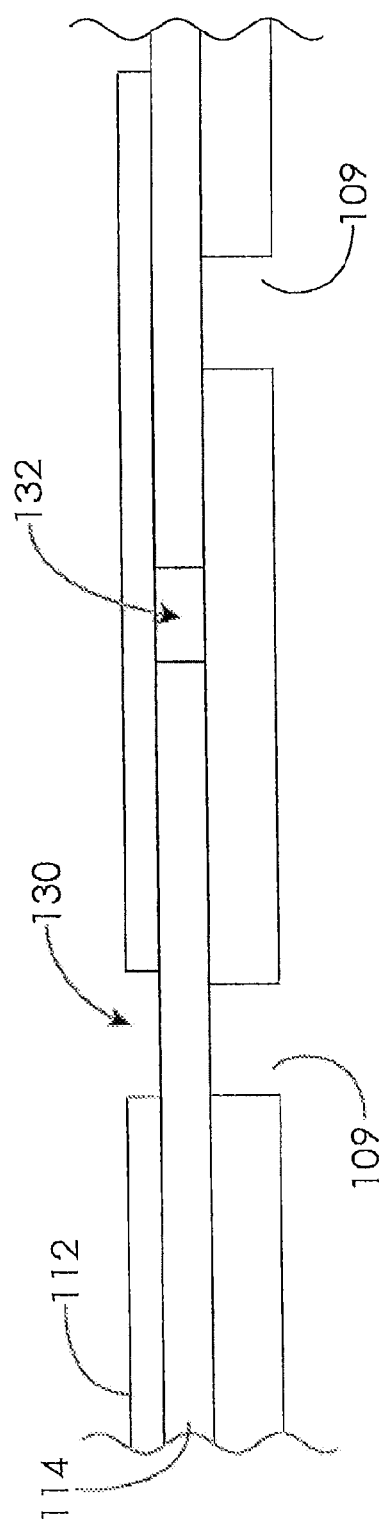
FIG. 4 is a schematic cross-sectional diagram of a seal and a seal cavity according to an embodiment of the present disclosure.

In order to form the seal 110, the second seal ends 126 and 128, of the second seal 114, are placed adjacent to the surfaces 105 and 107 of the components 104 and 106 respectively. The first seal 112 is disposed within the second seal 114, such that the opposing first seal ends 118 and 120 are positioned adjacent to the opposing second seal ends 126 and 128 respectively. In one embodiment, as shown in FIGS. 3 and 4, the first seal 112 further includes at least one first seal gap 130 extending from one of the opposing first seal ends 118 through the first seal base 116 to the other opposing first seal end 120. In one embodiment, the second seal 114 includes at least one second seal gap 132 extending from one of the opposing second seal ends 126 through the second seal base 124 to the other opposing second seal end 128. The at least one first seal gap 130 and the at least one second seal gap 132 enable flex of the first seal 112 and the second seal 114, respectively, in the radial direction to allow for thermal expansion and contraction of the first seal 112 and the second seal 114. For example, component 106 may include a plurality of components circumferentially aligned adjacent to one another around the axial centerline of the turbine engine creating a component gap 109. The at least one second seal gap 132 is positioned as to not align with the design clearance 108. Furthermore, the at least one first seal gap 130 is positioned as to not align with the each of the at least one second seal gaps 132. It will be appreciated that the seal 110 may include at least one retention means (not shown) to prevent circumferential position biasing during operation of the components 104 and 106. The first seal 112 and the second seal 114 are formed from materials appropriate to the anticipated operating conditions (e.g., deflection, temperature change, pressure, etc.) of the seal 110, such as a nickel-base alloy to name just one non-limiting example.

Referring back to FIG. 2, pressure in a secondary flow cavity 134 is transmitted to the seal cavities 100 and 102 through an opening 136 defined between the components 104, 106. This pressure acts upon the surfaces of the first seal 112 and the second seal 114 to seat the second seal 114 against the surfaces 138 and 140 of the component 104 and the surfaces 142 and 144 of the component 106. The first seal 112 seats against the second seal 114. The pressure applied also helps the first seal base 116 and the second seal base 124 to seat above the nominal design clearance 108. This prevents most or all of the secondary flow cavity 134 gases from reaching the nominal design clearance 108 area and flow path. As the two components 104 and 106 move relative to each other in the axial and/or radial direction, the seal 110 is free to slide in the circumferential direction while the pressure forces acting upon the seal 110 load the seal 110 so that it remains in contact with both components 104 and 106 as shown. Therefore, sealing is maintained while the components 104 and 106 move relative to one another. Because the seal 110 may slide with respect to the components 104, 106, the seal 110 is not substantially deflected by the relative movement between the components 104 and 106.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A system, comprising:
    a first component, circumferentially disposed around a center axis, including a first surface;
    a second component, circumferentially disposed around the center axis, including a second surface, the second component disposed adjacent the first component and defining a seal cavity therebetween; and
    a seal for sealing a space defined by the first and second components, the seal comprising:
        a first seal including: a first seal base substantially centered about a longitudinal seal plane extending through a center of the seal cavity, the longitudinal seal plane being perpendicular to the center axis, the first seal base having a convex portion substantially centered about the longitudinal seal plane;
        opposing first seal ends extending from the first seal base toward the longitudinal seal plane, wherein the opposing first seal ends extend substantially perpendicularly toward the longitudinal seal plane and the convex portion of the first seal based extends away from the opposing first seal ends and wherein the first seal includes at least one first seal gap, extending from one of the opposing first seal ends through the first seal base to the other opposing first seal end;
        a second seal including: a second seal base, and opposing second seal ends extending from the second seal base toward the longitudinal seal plane, wherein the opposing second seal ends extend substantially perpendicularly toward the longitudinal seal plane and wherein the second seal includes at least one second seal gap extending from one of the opposing second seal ends through the second seal base to the other opposing second seal end, wherein the at least one first seal gap is positioned to not align with the at least one second seal gap;
        wherein the first seal is disposed within the second seal; and
        wherein the first seal and the second seal are configured to sealingly engage with the first and second components, wherein the at least one first seal gap is positioned to not align with the at least one second seal gap.

2. The system of claim 1, wherein the first seal includes a substantially arcuate cross-sectional shape.

3. The system of claim 1, wherein the second seal includes a substantially arcuate cross-sectional shape.

4. The system of claim 1, wherein the opposing first seal ends are positioned adjacent to the opposing second seal ends.

5. The system of claim 1, wherein the first seal is formed from a nickel-based alloy.

6. The system of claim 1, wherein the second seal is formed from a nickel-based alloy.

7. The system as in claim 1, wherein the seal cavity comprises a substantially arcuate shape.

8. The system of claim 7, wherein the at least one first seal includes a substantially arcuate shape.

9. The system of claim 7, wherein the second seal includes a substantially arcuate shape.

* * * * *